No. 857,564. PATENTED JUNE 18, 1907.
F. B. LEOPOLD & C. A. BROWN.
METHOD OF FEEDING LIME TO WATER.
APPLICATION FILED JULY 13, 1906.
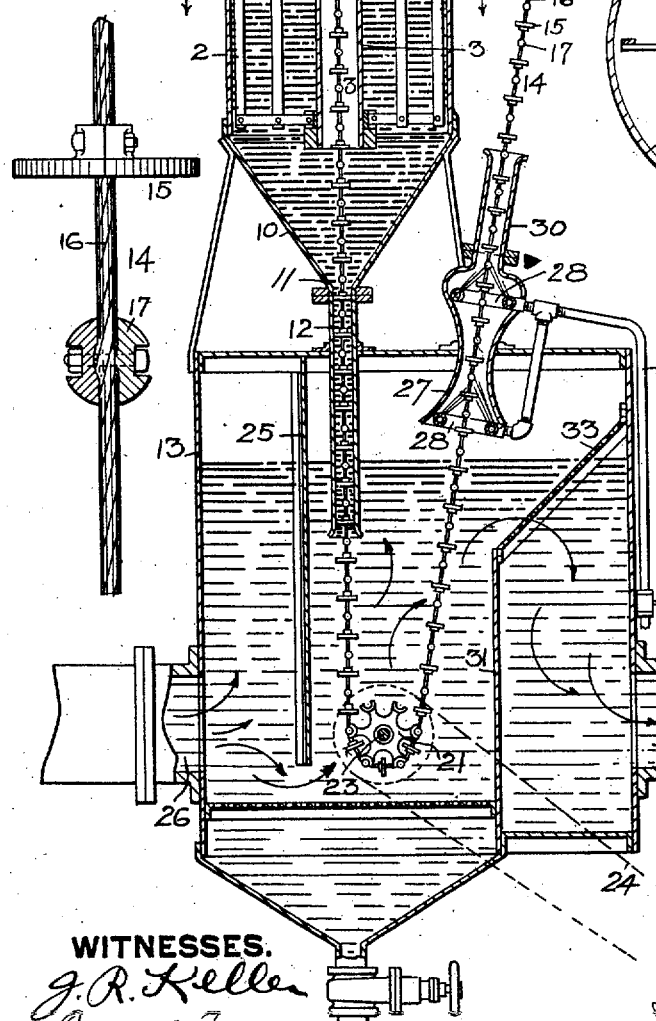

UNITED STATES PATENT OFFICE.

FREDERICK B. LEOPOLD, OF EVANSTON, ILLINOIS, AND CHARLES ARTHUR BROWN, OF LORAIN, OHIO; SAID LEOPOLD ASSIGNOR TO PITTSBURGH FILTER MANUFACTURING COMPANY, OF PITTSBURG, PENNSYLVANIA, A CORPORATION OF PENNSYLVANIA.

METHOD OF FEEDING LIME TO WATER.

No. 857,564.      Specification of Letters Patent.      Patented June 18, 1907.

Application filed July 13, 1906. Serial No. 325,987.

*To all whom it may concern:*

Be it known that we, FREDERICK B. LEOPOLD, a resident of Evanston, in the county of Cook and State of Illinois, and CHARLES ARTHUR BROWN, a resident of Lorain, in the county of Lorain, State of Ohio, have invented a new and useful Improvement in Methods of Feeding Lime to Water; and we do hereby declare the following to be a full, clear, and exact description thereof.

Our invention relates to the method of purifying or softening water, and more especially to the manner of introducing the lime thereto.

Heretofore the method ordinarily employed in purifying or softening water has been to first form a lime paste in a suitable receptacle and then introduce the lime paste into another suitable receptacle where the paste is reduced to a fluid, which fluid is then introduced in proper quantities to the water to be treated. By this process an extra receptacle was required for the lime water, which thereby increased the size and cost of the plant.

The object of our invention is to simplify the method of applying the lime to the water and so reduce the time as well as the cost of the operation.

To these ends our invention comprises, generally stated, the method of introducing lime in the form of paste into water to be softened by subdividing the paste and feeding the previously determined subdivisions directly to the water to be treated.

In the accompanying drawing we have illustrated a suitable form of apparatus for carrying out our invention, in which Figure 1 is a sectional elevation of the apparatus; Fig. 2 is a cross section on the line 2—2, Fig. 1; Fig. 3 is a detail of the conveyer; Fig. 4 is a detail of sprocket and conveyer.

Like numerals indicate like parts in each of the figures.

The apparatus which we have illustrated as suitable for carrying out our invention, forms the subject matter of a separate application filed by us for Letters Patent of the United States on the 13th day of July, 1905, Serial No. 325,986.

The numeral 2 designates a suitable bin or receptacle adapted to contain lime paste of a certain known strength or consistency. This paste is formed in a suitable receptacle by adding the proper amount of water to the slaked lime, and the paste so formed is then introduced into the receptacle 2. Supported within said bin 2 is the hollow shaft 3 with the beveled cog 4 at the upper end thereof, with which the beveled opening 5 on the shaft 6 meshes. A stirrer 7 is secured to the shaft 3, said stirrer comprising the radiating arms 8 connected by the vertical strips 9. At the lower end of the bin 2 is the hopper 10 with the circular outlet 11. A cylinder or conduit 12 projects downwardly from the outlet 11 into the tank 13 containing the water to be treated. The lower end of the cylinder 12 is outwardly flaring. The conveyer 14 carries pistons or flights 15 secured at suitable intervals to the cable 16. The cable 16 has the balls 17 secured thereto at intervals, said balls being adapted to engage correspondingly shaped recesses 18 in the sprocket wheels 19, 20 and 21. Said sprocket wheels are further provided with recesses 22 which receive the pistons 15. The conveyer 14 engages the sprocket wheels 19, 20 and 21 as shown, the sprocket wheel 21 acting to drive the said conveyer, and being mounted on the driving shaft 23 connected up by the belt 24 to any suitable motor. The pistons 15 on the conveyer 14 pass down through the hollow shaft 3 and through the bin 2, whence they pass through the cylinder 12 into the tank 13. In this manner the lime paste is conveyed from the bin 2 in measured quantities, so that it is always possible to tell just how much of the paste is being carried into the water of the tank 13, and it is apparent that by adjusting the pistons 15 the quantity of paste held between two contiguous pistons may be increased or diminished.

Within the tank 13 is the downwardly projecting baffle 25 which extends below the water level and opposite the inlet 26, so that the water entering said tank is deflected downwardly by said baffle. The purpose of this baffle 25 is to increase the velocity of the inflowing water and direct it with full force against the sprocket wheel 21, adjacent to the lower end of said baffle, so as to flush said wheel and wash off any of the lime paste adhering thereto or to the pistons as they pass around said wheel. This prevents the said wheel from becoming clogged so as to interfere with the proper engagement of the conveyer therewith. As a further precaution against the paste adhering to the pistons, we provide the spraying apparatus which comprises the bell-shaped shell or casing 27 within which are supported the circular spray pipes 28 connected up to the supply pipe 29. The water from these spray pipes 28 is directed toward the pistons passing through said shell and the paste washed therefrom passes back into the tank 13. A circular passage 30 may extend for a short distance from the upper end of the casing 27 to receive the pistons where the tank 13 is closed to operate under pressure. The wall 31 in the tank 13 separates the main portion of the tank from the outlet 32. From the upper end of the wall 31 a perforated plate 33 extends to the walls of the tank to form a strainer. At the bottom of the tank 13 is a valve controlled outlet for removing the deposit in the form of carbonates.

In carrying out our method in connection with the above described apparatus, the lime paste is introduced into the bin 2, and the water to be treated is admitted to the tank 13 in determined quantities. Power is then applied to operate the conveyer 14. As the conveyer passes through the lime paste in the bin 2, the pistons carry with them into the cylinder 12 a fixed and definite amount of lime or just so much as may be contained between two contiguous pistons. The distance apart of the pistons controls the amount, and when once this has been determined, the proper proportion of lime with reference to the quantity of water to be treated always remains fixed. If the quantity of lime is to be changed or introduced in different proportions, the pistons are readily adjusted accordingly. In this manner the proportion of lime to be introduced may be determined with great accuracy and when once fixed, the apparatus works without further supervision. The movement of the pistons is positive and sure, so that there is practically no liability of deviation.

By our improved method the lime in the form of paste is introduced directly into the water to be treated, and we dispense with the step heretofore believed necessary, namely, that of reducing the lime paste to a liquid before introducing it to the water to be treated. In this way we have simplified the process, while at the same time we provide for the introduction of the paste to the water to be treated, in pre-determined quantities, so that it becomes thoroughly mixed with the water to be treated, and it is possible to regulate the supply of paste with greater accuracy than where the lime was introduced in the form of a liquid.

What we claim as our invention is:

The method of introducing lime in the form of paste to water to be treated, consisting in subdividing the mass of paste into previously determined quantities, and then feeding the subdivisions successively directly to the water to be treated.

In testimony whereof, we, the said FREDERICK B. LEOPOLD and CHARLES A. BROWN have hereunto set our hands.

FREDERICK B. LEOPOLD.
CHARLES ARTHUR BROWN.

Witnesses as to Leopold:
S. W. JAMES,
ROBERT C. TOTTEN.
Witnesses as to Brown:
WM. L. HUGHES,
LOTTIE CLAWSON.